Patented Oct. 31, 1939

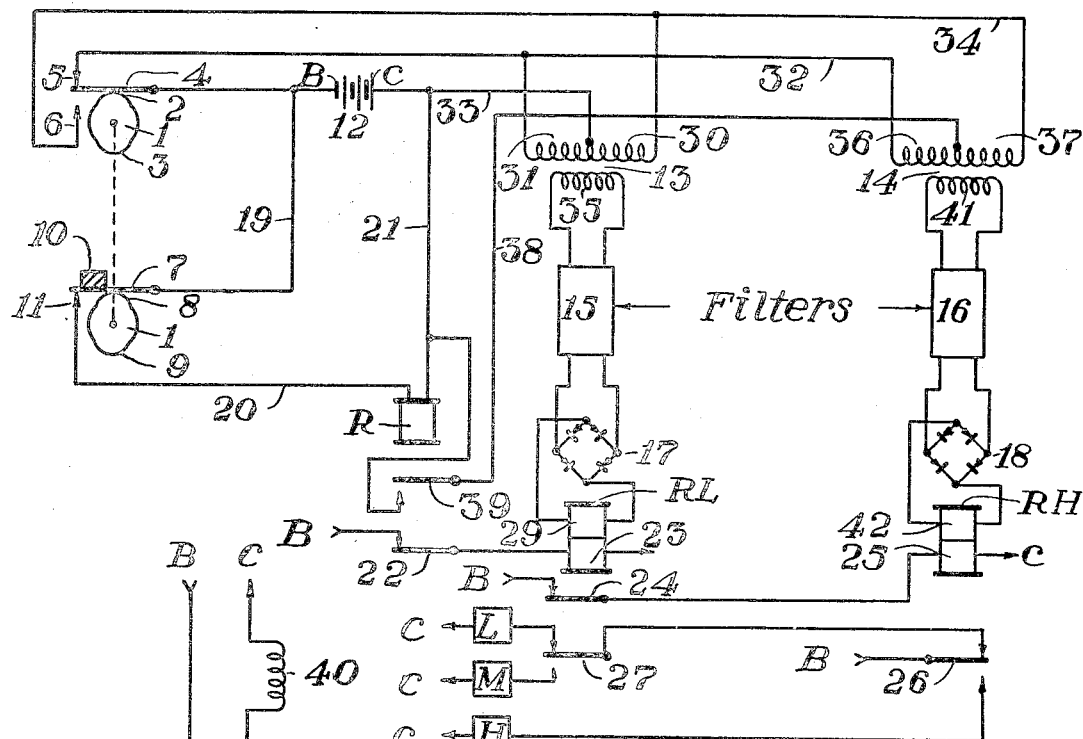

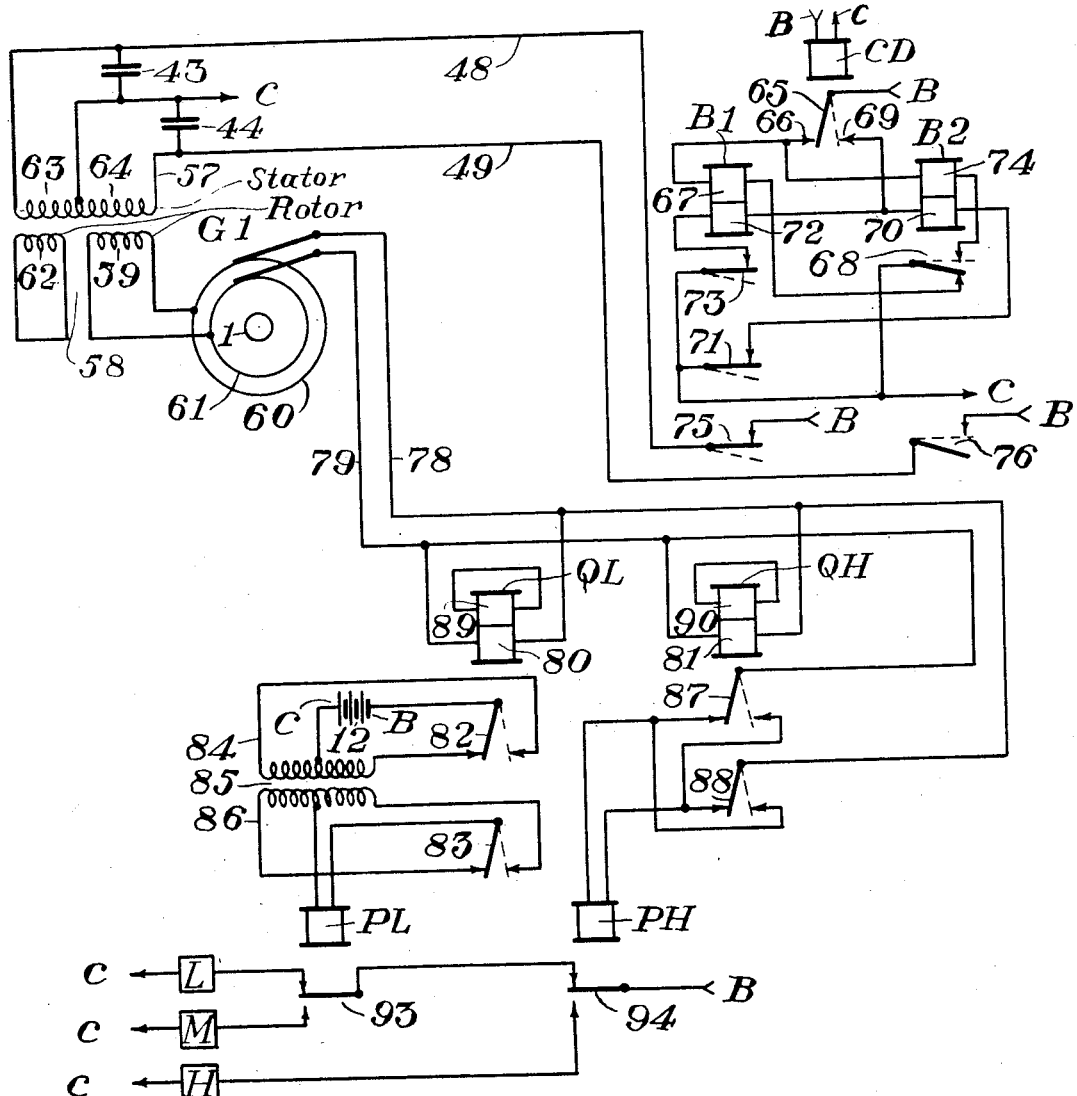
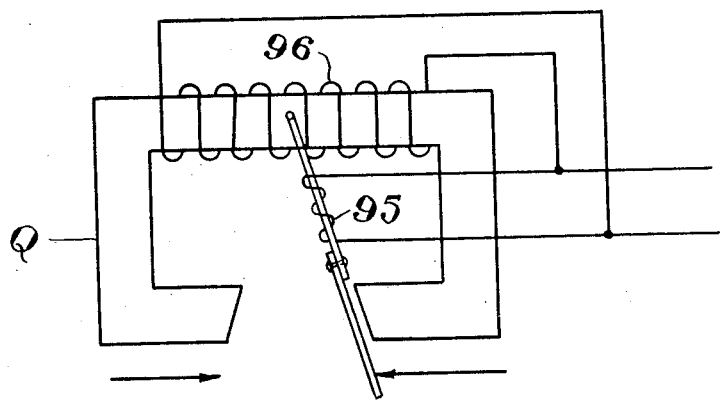
Fig. 3.
Fig. 3A.

2,178,290

UNITED STATES PATENT OFFICE 2,178,290

SPEED RESPONSIVE APPARATUS

Andrew J. Sorensen, Edgewood, Pa., assignor to The Union Switch & Signal Company, Swissvale, Pa., a corporation of Pennsylvania Application September 29, 1937, Serial No. 166,378

35 Claims. (Cl. 175—355)

My invention relates to speed responsive apparatus which is particularly adapted for, but in no way limited to, use on railway vehicles for governing the braking system or motive power, or both, of the vehicle in accordance with its speed.

It is well-known that the coefficient of friction between a brake shoe and the surface of a car wheel varies inversely with the speed at which the wheel is rotating, being large at low speed and being relatively small at high speeds. In order to obtain the braking force necessary to properly retard a train when it is travelling at extremely high speeds, the braking equipment is designed so that the brake shoes are pressed against the wheels with great force to compensate for the low coefficient of friction existing at that time between the brake shoes and the wheels. The degree of force employed to press the brake shoes against the wheels is referred to as the braking ratio and is measured by comparing the force available to press the shoes against the wheels of a vehicle with the weight of the vehicle.

As the speed of the vehicle is reduced the coefficient of friction between the brake shoes and the vehicle wheels increases, and if the same great force is employed to press the shoes against the wheels, so much retarding force will be developed between the shoes and the wheels that the wheels will cease to rotate and will slide on the track. This is objectionable as flat spots are worn on the wheels, while the adhesion between a sliding wheel and a rail is much less than that between a rotating wheel and a rail with the result that when the wheels are caused to slide the rate of retardation of the train is reduced and the distance required for a stop is correspondingly increased.

It has heretofore been proposed to provide a brake equipment which may be selectively conditioned to develop either of a plurality of different degrees of braking force suitable for vehicle speeds in different speed ranges. A brake equipment of this type is shown in United States Patent No. 2,095,505, issued October 19, 1937, to George W. Baughman, and assigned to The Westinghouse Air Brake Company.

It has also been proposed heretofore to provide means responsive to the speed of a vehicle for selectively conditioning the vehicle brake equipment for operation at different vehicle speeds. The speed responsive means heretofore provided have employed centrifugal devices mounted on and driven by an axle of a vehicle. A device mounted on a vehicle axle is not protected by the vehicle springs, and is, therefore, subjected to the full force of impacts on the vehicle wheels occasioned by irregularities in the track, such as joints between rails, switches, crossovers and the like. A device mounted on a vehicle axle, therefore, is subjected to constant vibration when the train is in motion. Obviously this is objectionable in apparatus which must be sensitive to small changes in vehicle speeds.

One object of my invention is to provide speed responsive apparatus the major portion of which may be located at some point remote from the wheels and axles of the vehicle so that such apparatus will be comparatively free from damage due to vibration, shock, etc.

Another object of my invention is to provide speed responsive apparatus which will respond accurately to changes in speed regardless of whether the vehicle is accelerating or decelerating.

A still further object of my invention is to provide apparatus utilizing a source of electrical energy which apparatus will be substantially immune to ordinary changes in the voltage of the source.

Other objects of my invention will become apparent as the specification progresses.

I shall describe several forms of speed responsive apparatus embodying my invention, and shall then point out the novel features thereof in the claims.

In the accompanying drawings,

Fig. 1 is a diagrammatic view showing one form of speed responsive apparatus embodying my invention as applied to a vehicle for varying the braking power of such vehicle in accordance with its speed. Fig. 2 is a diagrammatic view of another form of apparatus for varying the braking power of a vehicle in accordance with its speed and each also embodying my invention. Fig. 3 is a diagram of another form of speed responsive apparatus embodying my invention. Fig. 3A is a diagram illustrating a form of relay which I may employ in the system shown in Fig. 3.

Similar reference characters refer to similar parts in each of the several views.

Referring first to Fig. 1, the reference character 1 designates a member capable of rotation, which may, for example, be an axle of a railway vehicle. Associated with axle 1 and operated by cams 2 and 3 suitably secured to the axle is a movable contact 4. When the vehicle is moving, the cams 2 and 3 on axle 1 cause contact 4 to become alternately engaged, at a speed corresponding to the speed of the vehicle, with contacts 5 and 6. Also associated with axle 1 is an inertia type contact 7 which is actuated by cams 8 and 9 suitably secured to the axle. Contact 7 is provided with a counterweight 10 so that contact 7—11 remains closed at all times except when the vehicle is moving in excess of a predetermined slow speed. When the vehicle is moving above the predetermined slow speed, contact 7—11 becomes periodically opened.

The inertia type contact is indicated diagrammatically since the particular form of contact forms no part of my invention and since a number of such contacts are well known. One such contact is disclosed and claimed in United States Letters Patent No. 1,912,924, granted June 6, 1933, to Per Utne and Ralph K. Crooks.

Although I have thus far described my invention as being applied to a rotating member, it is understood that it may be applied equally as well to a reciprocating member such, for example, as a crosshead, or to any member capable of motion.

Located on the vehicle at a point remote from axle 1 is speed responsive apparatus which, as here shown, comprises a pair of transformers 13 and 14, a pair of frequency filters 15 and 16, a pair of rectifiers 17 and 18, a pair of control relays RL and RH, and an auxiliary relay R. For supplying energy for the operation of this and other apparatus, I provide a battery 12 the terminals of which are designated by the reference characters B and C.

As will be explained more in detail hereinafter, transformers 13 and 14 are supplied with alternating current the frequency of which corresponds to the speed of the vehicle, and the frequency filters 15 and 16 pass such energy through rectifiers 17 and 18, respectively, to control relays RL and RH. The design and construction of such frequency filters being well known, it will be considered sufficient to state that filter 15 will pass only those frequencies which correspond to the speeds of the vehicle below, for example, 30 miles per hour, and filter 16 will pass only those frequencies which correspond to the speeds of the vehicle below, for example, 60 miles per hour.

The relays RL and RH as here shown are utilized to control the low speed, medium speed, and high speed brake magnets designated by the reference characters L, M, and H, respectively. That is, magnet L when energized may condition the braking system (not shown) of the vehicle for a normal braking power or braking ratio, whereas magnets M and H when energized may condition the braking system of the vehicle for braking powers of 150 per cent and 200 per cent, respectively, of the normal value.

While I have thus far described magnets L, M, and H as being utilized for varying the braking ratio of the vehicle in accordance with its speed, it is understood that my invention may also be used to cause an automatic brake application if the vehicle exceeds a given authorized speed, or to govern the speed of the vehicle more directly by controlling the motive power.

When the vehicle is at rest, as shown in the drawings, the inertia contact 7—11 is closed and the auxiliary relay R is energized by a circuit which passes over a path from terminal B of battery 12 through wire 19, inertia contact 7—11, wire 20, relay R, and wire 21 to terminal C of battery 12. The closing of front contact 22 of relay R completes an easily traced circuit for lower winding 23 of relay RL so that front contact 24 of relay RL is closed to complete an easily traced circuit for winding 25 of relay RH. Thus, with both relays RL and RH in their energized condition, magnet L is supplied with energy by a circuit which passes over a path from terminal B through front contact 26 of relay RH, front contact 27 of relay RL, and magnet L to terminal C. Since brake magnet L is energized, the braking system of the vehicle is conditioned so that upon a brake application the power actually applied to the wheels and axles for stopping the vehicle will be of some predetermined value which I have termed the normal value.

It is desirable that a control system for the purpose for which this system is intended should operate on the closed circuit principle, that is, that the equipment controlled by the system should normally assume a predetermined condition, and should be caused to assume a different condition when and only when the control system is energized and is functioning in the intended manner.

For example, where the control system is employed to condition a brake equipment to provide different degrees of brake application, the brake equipment is arranged and constructed to provide the maximum degree, or a predetermined relatively high degree, of braking power, while the control system, when energized, which is the condition when the vehicle is idle or is travelling at a low speed, adjusts the brake equipment to provide only a lesser degree of braking power.

When the vehicle speed is increased above a predetermined rate, the control system, or a portion thereof, is deenergized, and the brake equipment is thereby conditioned to provide a higher degree of braking power.

This mode of operation provides important safety features. As the control system operates on the closed circuit principle, if for any reason, such as failure of the source of electric current, the control system should become deenergized at a time when it should be energized, the braking power provided by the brake equipment will be increased and not decreased with the result that adequate braking power will be available to stop the vehicle.

It is difficult to provide mechanism which will operate both to maintain the control system energized until a predetermined vehicle speed, such as 30 miles an hour, is reached, and to effect deenergization of the control equipment at higher vehicle speeds, and to also maintain the control equipment energized when the vehicle is standing still or is moving at extremely low speeds.

The auxiliary relay R incorporated in the system shown in Fig. 1 of the drawings of this application provides means to maintain the relays RL and RH energized when the vehicle is standing still or is travelling at extremely low speeds. At this time, therefore, the brake equipment controlled by the control system is conditioned to provide the minimum degree of braking power, which is the proper value for these vehicle speeds.

As explained in Patent No. 1,912,924 previously referred to, the periods during which contact 7—11 is opened become increasingly greater in time with an increase in the speed of rotation of axle 1. It follows, therefore, that relay R may be so chosen and adjusted as to release at some predetermined slow speed.

The various parts of the system shown in Fig.

1 of the drawings are selected and adjusted so that on an increase in the speed of the vehicle from the idle condition, the relay R does not become released until after the vehicle speed has been increased to some predetermined relatively low value, such as 5 miles per hour.

On this increase in the speed of the vehicle there is an increase in the supply of energy through transformer 13, filter 15 and rectifier 17 to winding 29 of relay RL. The various parts of the equipment are also selected and adjusted so that before the speed of the vehicle is increased to the value at which the relay R becomes released, the winding 29 of the relay RL is sufficiently energized to maintain the relay contacts picked up. Accordingly on release of relay R, with the resultant deenergization of winding 23 of relay RL, the contacts of relay RL will be maintained picked up by winding 29 of relay RL.

I shall assume next that the vehicle is moving slightly in excess of the speed at which relay R becomes released so that energy is disconnected from lower winding 23 of relay RL. In the meantime, however, as explained in detail below, upper winding 29 of relay RL will be receiving energy from transformer 13 through frequency filter 15 and rectifier 17 so that relay RL will remain in its energized condition to maintain in the closed condition the circuit for lower winding 25 of relay RH.

When the vehicle is moving, as a result of operation of contact 4, the right and left-hand portions 30 and 31 of the primary winding of transformer 13 are alternately energized in opposite directions. The closing of contact 4—5 causes current to flow from terminal B of battery 12 through contact 4—5, wire 32, left-hand portion 31 of the primary winding of transformer 13, and wire 33 to terminal C of battery 12; whereas the closing of contact 4—6 causes current to flow from terminal B of battery 12 through contact 4—6, wire 34, right-hand portion 30 of the primary winding of transformer 13, and wire 33 to terminal C of battery 12. The alternate energizations of windings 31 and 30 of transformer 13 being of a frequency corresponding to the speed of the vehicle will, of course, induce alternating current of the same frequency in secondary winding 35 of transformer 13.

As previously stated, the filter unit 15 is selected and arranged so that it will pass alternating current supplied thereto as long as the frequency of the current corresponds to a vehicle speed of 30 miles per hour or less. Accordingly the winding 29 of the relay RL will be energized and will maintain the relay contacts picked up until the speed of the vehicle exceeds 30 miles per hour.

It will be observed that contact 39 of relay R, when picked up, interrupts the circuits of the primary windings of transformer 14. As a result the current consumption when the vehicle is standing still or is travelling at a low speed is reduced to the minimum.

I shall next assume that the speed of the vehicle has been increased to some value slightly in excess of 30 miles per hour. Under this condition, frequency filter 15 will not pass sufficient current to winding 29 of relay RL with the result that this relay becomes released to open its front contact 24 and to close the back point of its contact 27. The opening of front contact 24 does not, however, release relay RH because, as will presently be explained, relay RH is now receiving energy from transformer 14. The closing of the back point of contact 27 of relay RL establishes a circuit for magnet M which circuit may be traced over a path which passes from terminal B through front point of contact 26 of relay RH and back point of contact 27 of relay RL to magnet M and terminal C. Thus, when the vehicle is moving at this speed, the braking system is conditioned for a braking power of approximately 150 per cent of the normal power.

When the vehicle is moving at a speed sufficient to cause the release of relay R, left-hand portion 36 of the primary winding of transformer 14 receives energy in one direction over a path which may be traced from terminal B of battery 12 through contact 4—5, wire 32, winding 36, wire 38, back contact 39 of relay R, and wire 21 to terminal C of battery 12. Right-hand portion 37 of the primary winding of transformer 14 receives energy in the opposite direction over a circuit which may be traced from terminal B of battery 12 through contact 4—6, wire 34, winding 37, wire 38, back contact 39 of relay R, and wire 21 to terminal C of battery 12. The alternate energization in opposite directions of windings 36 and 37 of transformer 14 induces an alternating current in secondary winding 41 of transformer 14 the frequency of which current, of course, corresponds to the speed of the vehicle. This current is passed by frequency filter 16 through rectifier 18 to upper winding 42 of relay RH so that, as long as the vehicle is moving below a predetermined high speed, relay RH remains in its energized condition to establish either the normal or the medium braking power in accordance with the condition of relay RL.

I shall next assume that the speed of the vehicle has been increased to some value above 60 miles per hour. When this occurs, the frequency of the current applied to filter 16 is such that the filter will not pass the current to winding 42 of relay RH with the result that relay RH becomes released to energize over the back point of its contact 26 the high speed braking magnet H. Thus, the braking system of the vehicle will be conditioned for a braking power of approximately 200 per cent of normal.

Upon deceleration of the vehicle, relay RH becomes picked up at approximately 60 miles per hour, relay RL becomes picked up at approximately 30 miles per hour, and relay R becomes picked up at some slow speed below 30 miles per hour so that the braking system is successively conditioned for the application of the various braking powers in accordance with the train speed.

Referring next to Fig. 2, I show a modified means for controlling the relays RL and RH shown in Fig. 1. In this modification, I employ an alternating current generator G which is provided with a rotor 50 driven by the axle 1 and with a stator 51 which is suitably secured to the vehicle frame. Stator 51 is provided with a primary winding 52 and a secondary winding 53. Winding 52 is directly connected to the terminals B and C of the source of direct current energy. Interposed between the terminals B and C and winding 52 is a reactor 40 which prevents excessive flow of alternating current in winding 52. Secondary winding 53 is connected to wires 54 and 55 which in turn supply energy to frequency filters 15 and 16. Since the frequency of the alternating current generated in secondary winding 53, and in turn supplied to wires 54 and 55, is proportional to the speed of the generator rotor 50 which is proportional to the speed of the vehicle, it follows that the frequency of the alternating current supplied by generator G is directly proportional to the speed of the vehicle. Thus, control relays RL and RH may be caused to pick up and release in accordance with the train speed to govern the braking system of the vehicle in the same manner as that described for the apparatus shown in Fig. 1.

I have found that a generator of the form shown in Fig. 2 will produce alternating current of substantially constant voltage irrespective of ordinary changes in the voltage of the direct current source. That is, with a proper selection of ampere turns of the primary winding 52, generator G will produce alternating current the voltage of which is independent of expected variations in the voltage of battery 12. It follows, therefore, that relays RL and RH will pick up and release in accordance with the speed of the vehicle and will not be subjected to false operation such as might be expected if the voltage of the alternating current were permitted to vary widely.

Referring next to Fig. 3, I provide a generator G1 for supplying alternating current the frequency of which corresponds to the speed of the vehicle. This generator, as here shown, comprises a stator 57 secured to the vehicle frame and a rotor 58 driven by the axle 1. Rotor 58 includes a winding 59 connected to slip rings 60 and 61, and includes also a short circuited winding 62. The purpose of the short circuited winding 62 is to absorb energy as the speed of the vehicle increases and thus tend to maintain at a constant value the voltage of the current produced by the generator. Stator 57 has a winding which includes a left-hand portion 63 and a right-hand portion 64 which at all times are alternately energized in opposite directions at a comparatively low rate by means hereinafter described in detail so that an alternating current of low frequency is induced in rotor winding 59. As will be explained more in detail hereinafter, the resulting low frequency output current of generator G1 is utilized to maintain the speed responsive apparatus in its energized condition when the vehicle is at rest or is moving at extremely slow speeds.

For improving the efficiency of the generator G1 and for in some measure controlling the wave shape of the output current, I connect condensers 43 and 44 across windings 63 and 64, respectively, of stator 57.

For governing the supply of low frequency alternating current to the stator windings 63 and 64, I utilize a pair of relays B1 and B2 which are controlled by a constantly operating motor coder CD. As here shown, the motor coder CD is directly connected to terminals B and C of the source of direct current energy so that its contact 65 is constantly operating at a fixed slow speed between an extreme right-hand position and an extreme left-hand position. Upon the first operation of contact 65, assuming this to be the closing of contact 65—66, as shown in the drawings, upper winding 67 of relay B1 becomes energized over a circuit which may be traced from terminal B through contact 65—66 of coder CD, winding 67 of relay B1, and back point of contact 68 of relay B2 to terminal C. Upon the second operation of coder CD with contact 65 in its right-hand position, winding 70 of relay B2 becomes energized by a circuit which may be traced over a path which passes from terminal B through contact 65—69 of coder CD, lower winding 70 of relay B2, and front contact 71 of relay B1 to terminal C. Relay B1 is also maintained in its energized condition upon the second operation of the coder CD by a circuit which may be traced over a path which passes from terminal B through contact 65—69 of coder CD, lower winding 72 of relay B1, and front contact 73 of relay B1 to terminal C. Upon the third operation of coder CD with contact 65 again in its left-hand position, relay B1 becomes deenergized because the back point of contact 68 of relay B2 is opened, but relay B2 is maintained in its energized condition by a circuit which may be traced over a path which passes from terminal B through contact 65—66 of coder CD, upper winding 74 of relay B2, and front point of contact 68 of relay B2 to terminal C. Upon the fourth operation of coder CD with contact 65 in its right-hand position, relay B1 remains deenergized and relay B2 also becomes deenergized because front contacts 73 and 71 of relay B1 are opened. Upon the fifth operation of coder CD, which is the beginning of a new cycle of operation, relay B1 again becomes energized over the previously traced circuit for winding 67 of relay B1, and upon succeeding operations of coder CD, the relays B1 and B2 go through another complete cycle of operation as just described.

From this description it will be seen that upon the first operation of coder CD front contact 75 of relay B1 is closed; upon the second operation of coder CD front contact 75 of relay B1 and front contact 76 of relay B2 are both closed; upon the third operation of coder CD front contact 75 becomes open, but front contact 76 remains closed; upon the fourth operation of coder CD the front contacts 75 and 76 are both open; and upon the fifth operation of coder CD, at the initiation of a new cycle, front contact 75 of relay B1 again becomes closed. When front contact 75 of relay B1 is closed, left-hand portion 63 of stator winding 57 becomes energized in one direction over an easily traced circuit which includes wire 48; and, when front contact 76 of relay B2 is closed, right-hand portion 64 of stator winding 57 becomes energized in the opposite direction over an easily traced circuit which includes wire 49. It follows, therefore, that alternating current of a low frequency is induced in rotor winding 59 which in turn supplies such current to generator leads 78 and 79 by slip rings 60 and 61.

Connected across generator leads 78 and 79 is the operating winding 80 of a low speed relay QL and the operating winding 81 of a high speed relay QH. The relays QL and QH are of the polarized type and are characterized by being inoperative when supplied with alternating current the frequency of which exceeds a predetermined value. That is, low speed relay QL will respond to all frequencies below those corresponding to speeds of approximately 30 miles per hour, and high speed relay QH will respond to all frequencies below those corresponding to 60 miles per hour.

The relays QL and QH, when operating, control the supply of unidirectional current to relays PL and PH, respectively, which relays govern the brake magnets L, M, and H in a manner similar to that described for the relays RL and RH shown in the previous figures.

When the vehicle is at rest and the motor coder CD is energized, the relays B1 and B2 will be energized and deenergized in the manner described in detail above, with the result that the two portions of the stator winding 57 will be alternately energized and deenergized, while alternating current will be induced in the rotor winding 58 at the frequency determined by the rate of operation of the relays B1 and B2.

The current which is induced in the rotor winding 58 is supplied through the wires 78 and 79 to the windings of the relays QL and QH, and when the vehicle is at rest, it will be apparent that relays QL and QH will be constantly operating their contacts between extreme right-hand and left-hand positions at a frequency corresponding to the frequency of the current supplied to the generator G1 by relays B1 and B2. When contacts 82 and 83 of relay QL are operating between their extreme right-hand and left-hand positions, the right-hand and left-hand portions of primary winding 84 of transformer 85 will be energized in opposite directions by current from battery 12 so that corresponding currents will be induced in the right and left-hand portions of secondary winding 86 of transformer 85. As will be seen, the middle terminal of secondary winding 86 is directly connected to relay PL, and the outer terminals of secondary winding 86 are connected by the right-hand and left-hand stationary contacts and the movable contact 82 of relay QL to the other terminal of relay PL in such manner that the current induced in opposite directions in winding 86 flows through the winding of relay PL in one direction only. In a similar manner, contacts 87 and 88 of relay QH, when operating, mechanically rectify the alternating current supplied to generator leads 78 and 79 so that the current supplied to relay PH flows in one direction only. Thus, as long as relays QL and QH are operating, relays PL and PH are maintained in their energized condition by unidirectional current mechanically rectified by contacts of relays QL and QH, respectively.

Although I have shown the relay PH as receiving current from generator leads 78 and 79, and relay PL as receiving current supplied by battery 12 and transformer 85, it is understood that if desired, either means may be utilized to supply current to either relay.

When the train is in motion the rotor of the generator is rotated with respect to the generator stator, and on this relative movement of the generator elements the frequency of the current induced in the rotor winding 59 increases above the frequency of the current supplied to the stator winding, the increase in the frequency of the current induced in the rotor winding being in accordance with the speed at which the rotor is rotated.

I shall next assume that the speed of the vehicle has been increased to some point above 30 miles per hour but below 60 miles per hour. At this speed, the frequency of the alternating current supplied by the generator G1 to operating winding 80 of relay QL is of such value that contacts 82 and 83 of relay QL are unable to follow the changes in polarity of the current with the result that these contacts remain in the position to which last operated. Under this condition, relay PL becomes released to close the back point of its contact 93 to complete a circuit for energizing medium speed braking magnet M.

The relay QH, having somewhat different characteristics than the relay QL, as previously pointed out, is able to follow the changes in polarity of current supplied by the generator at times when the train speed is below 60 miles per hour. The relay PH, therefore, will continue to be energized and will maintain its movable contact 94 in engagement with its front point of contact so that when the contact 93 of relay PL is released, current will be supplied to the medium speed braking magnet M.

I shall next assume that the speed of the train has been increased to some value in excess of 60 miles per hour with the result that the generator G1 is producing alternating current of the corresponding relatively high frequency. Under this condition, contacts 87 and 88 of relay QH become inoperative with the result that control relay PH becomes released to close the back point of its contact 94 to complete a circuit for energizing the high speed brake magnet H. Upon deceleration of the vehicle, relays QH and QL again become operative at train speeds below 60 miles per hour and 30 miles per hour, respectively, to energize the relays PH and PL.

I have found that the relays QL and QH may be so designed and constructed as to have relatively sharply defined cut-off limits. That is, the relays QL and QH can be arranged to become operative or inoperative according to the frequency of the current supplied to their operating windings regardless of whether the vehicle is accelerating or decelerating. For the purpose of improving the cut-off of these relays, I provide short circuited windings 89 and 90 of relays QL and QH, respectively. It is, of course, apparent that the cut-off of the relays Q may be further regulated by varying the value of the current supplied to the operating windings.

If desired, the relays Q may be modified as shown in Fig. 3A wherein the operating winding is designated by the reference character 95 and a field winding is designated by the reference character 96. This modification provides a relay of substantially the same cut-off value irrespective of voltage changes due to the fact that the field winding which is connected in multiple with the operating winding tends to increase the strength of the field upon an increase in voltage, which increased field strength tends to make the relay relatively harder to operate.

Although I have herein shown and described only a few forms of speed responsive apparatus embodying my invention, it is understood that various changes and modifications may be made therein within the scope of the appended claims without departing from the spirit and scope of my invention.

Having thus described my invention, what I claim is:

1. Speed responsive apparatus for a moving member comprising a plurality of relays, equipment controlled by said member for producing electrical currents of different characteristics depending upon the speed of movement of said member, control means receiving energy from said equipment for selectively governing said relays in accordance with the characteristics of the current produced by said equipment, and means responsive to movement of said member for preventing said control means from governing said relays unless the member is moving at a speed above a predetermined minimum.

2. Speed responsive apparatus for a moving member comprising a plurality of relays, equipment controlled by said member for producing electrical currents of different characteristics depending upon the speed of movement of said member, control means receiving energy from said equipment for selectively governing said relays in accordance with the characteristics of the current produced by said equipment, means responsive to movement of said member for preventing said control means from governing said relays unless the member is moving at a speed above a predetermined minimum, and means governed by said relays for controlling the speed of said member.

3. Speed responsive apparatus for a moving member comprising a plurality of relays, equipment controlled by said member for producing electrical currents of different characteristics depending upon the speed of movement of said member, control means receiving energy from said equipment for selectively governing said relays in accordance with the characteristics of the current produced by said equipment, means responsive to movement of said member for preventing said control means from governing said relays unless the member is moving at a speed above a predetermined minimum, and governing means for said member selectively controlled by said relays.

4. Speed responsive apparatus for a moving member comprising a plurality of relays, means responsive to movement of said member for maintaining said relays in an energized condition when said member is at rest or is moving below a predetermined rate of speed, equipment controlled by said member for producing electrical currents of different characteristics depending upon the speed of movement of said member, and control means receiving energy from said equipment for also energizing said relays and for subsequently releasing said relays selectively in accordance with characteristics of the current produced by said equipment when the member is moving above said predetermined rate of speed.

5. Speed responsive apparatus for a moving member comprising a relay, equipment controlled by said member for producing electrical currents of different characteristics depending upon the speed of movement of said member, control means receiving energy from said equipment for operating said relay when current produced by said equipment is of certain characteristics, means responsive to movement of said member for preventing the operation of said relay when said member is at rest or is moving at a very slow speed, two control devices for said member, one high speed and one low speed, and means governed by said relay for selectively controlling said devices.

6. Speed responsive apparatus for a moving member comprising, a low speed relay, a high speed relay, equipment controlled by said member for producing electrical currents of different characteristics depending upon the speed of movement of said member, control means receiving energy from said equipment for selectively governing said low speed and high speed relays in accordance with the characteristics of the current produced by said equipment, means responsive to movement of said member for preventing said control means from governing said relays unless the member is moving at a speed above a predetermined minimum, a low speed control device for said member, a medium speed control device for said member, a high speed control device for said member, and means controlled by said relays for selectively governing said devices.

7. Speed responsive apparatus for a moving member comprising, a relay, means responsive to movement of said member for maintaining said relay in an energized condition when said member is at rest or is moving below a predetermined rate of speed, equipment controlled by said member for producing electrical currents of different characteristics depending upon the speed of movement of said member, control means receiving energy from said equipment and effective when said member is moving above said predetermined rate of speed for also energizing said relay and for subsequently releasing said relay when a particular character of current is produced by said equipment, a low speed control device for said member, a high speed control device for said member, a circuit for said low speed device including a front contact of said relay, and a circuit for said high speed device including a back contact of said relay.

8. Speed responsive apparatus for a moving member comprising a high speed relay and a low speed relay, means responsive to movement of said member for maintaining said relays in an energized condition when said member is at rest or is moving below a predetermined rate of speed, equipment controlled by said member for producing electrical currents of different characteristics depending upon the speed of movement of said member, control means receiving energy from said equipment and effective when said member is moving above said predetermined rate of speed for also energizing said relays and for subsequently releasing said relays selectively in accordance with the characteristics of the current produced by said equipment, a low speed control device for said member, a medium speed control device for said member, a high speed control device for said member, a circuit for said low speed device including a front contact of said low speed relay and a front contact of said high speed relay, a circuit for said medium speed device including a back contact of said low speed relay and a front contact of said high speed relay, and a circuit for said high speed device including a back contact of said high speed relay.

9. Speed responsive apparatus for a moving member, said apparatus comprising a plurality of relays for selectively governing said moving member, equipment including a contact governed by said member for producing electrical currents of different characteristics depending upon the speed of movement of said member, control means receiving energy from said equipment for selectively governing said relays in accordance with the characteristics of the current produced by said equipment, and means responsive to movement of said member for preventing said control means from governing said relays unless the member is moving at a speed above a predetermined minimum.

10. Speed responsive apparatus for a moving member, said apparatus, comprising a plurality of relays for selectively governing said moving member, equipment including a generator governed by said member for producing alternating currents of different frequencies depending upon the speed of movement of said member, control means receiving energy from said equipment for selectively governing said relays in accordance with the frequency of the current produced by said equipment, and means responsive to movement of said member for preventing said control means from governing said relays unless the member is moving at a speed above a predetermined minimum.

11. Speed responsive apparatus for a moving member comprising, a plurality of relays, equipment controlled by said member for producing alternating currents of different frequencies depending upon the speed of movement of said member, control means receiving energy from said equipment and including frequency filters for passing currents of different frequencies for selectively governing said relays in accordance with the frequencies of the current produced by said equipment, and means responsive to movement of said member for preventing said control means from governing said relays unless the member is moving at a speed above a predetermined minimum.

12. Speed responsive apparatus for a moving member comprising, a plurality of control relays, means controlled by said member for energizing each control relay in alternate directions at different frequencies depending upon the speed of movement of said member, each said control relay having an armature which is capable of following said alternations only if the frequency is below a given value, each such value being different for each relay, a plurality of auxiliary relays, and means governed by said control relays for selectively controlling said auxiliary relays in accordance with the condition of the armature of the associated control relay.

13. Speed responsive apparatus for a moving member comprising, a plurality of control relays, means controlled by said member for energizing each control relay in alternate directions at different frequencies depending upon the speed of movement of said member, each said control relay having an armature which is capable of following said alternations only if the frequency is below a given value, each such value being different for each relay, a plurality of auxiliary relays, means for energizing said auxiliary relays provided the armature of the associated control relay is operating, and other means for also energizing said auxiliary relays when said member is at rest.

14. Speed responsive apparatus for a moving member comprising, a plurality of relays, means including a contact controlled by said member for energizing said relays when said member is at rest or is moving at very slow speeds, equipment controlled by said member for producing electric currents of different characteristics in accordance with the speed of movement of said member, control means for each relay connected between said equipment and the associated relay and capable of energizing the associated relay only if the current produced by said equipment is of a certain characteristic, said control means being each responsive to currents of different characteristics.

15. Speed responsive apparatus for a moving member comprising, a plurality of relays, means including a contact controlled by said member for energizing said relays when said member is at rest or is moving at very slow speeds, equipment including another contact controlled by said member for producing electric currents of different characteristics in accordance with the speed of movement of said member, and control means for each relay connected between said equipment and the associated relay and capable of energizing the associated relay if and only if the current produced by said apparatus is of a certain characteristic, said control means being each responsive to currents of different characteristics.

16. Speed responsive apparatus for a moving member comprising, a movable contact arranged to be alternately in engagement with front and back points at a rate corresponding to the speed of movement of said member, a first transformer and a second transformer each having a secondary winding and a primary winding, each primary winding having two outer terminals and a middle terminal, means connecting one terminal of a source of current to the middle terminal of each primary winding, means connecting the other terminal of said source to said movable contact, means connecting said front contact to one outer terminal of each primary winding, means connecting said back contact to the other outer terminal of each primary winding, a first filter capable of passing current of a given frequency connected to the secondary of said first transformer, a second filter capable of passing current of another given frequency connected to the secondary of said second transformer, and a first and a second relay connected to said first and second filters respectively.

17. Speed responsive apparatus for a moving member comprising, a first relay and a second relay each provided with a main winding and an auxiliary winding, means including a contact governed by said member for maintaining each auxiliary winding energized when and only when the member is at rest or is moving at very slow speeds, means governed by said member for generating alternating currents of different frequencies in accordance with the speed of movement of said member, means for passing said current to the main winding of said first relay effective only if the frequency is below a predetermined value, and means for passing said current to the main winding of said second relay effective only if the frequency is below a different predetermined value.

18. Speed responsive apparatus for a moving member comprising, a first relay and a second relay each provided with a main winding and an auxiliary winding, a contact which becomes opened only when said member is moving at a speed above a predetermined minimum, a checking relay which is energized at all times except when said contact becomes opened, a circuit including a front contact of said checking relay for energizing the auxiliary winding of said first relay, a circuit including a front contact of said first relay for energizing the auxiliary winding of said second relay, means governed by said member for generating alternating currents of different frequencies in accordance with the speed of movement of said member, means for passing said current to the main winding of said first relay effective only if the frequency is below a predetermined value, and means for passing said current to the main winding of said second relay effective only if the frequency is below a different predetermined value.

19. Speed responsive apparatus for a moving member comprising, a first relay and a second relay, means for generating alternating currents of different characteristics in accordance with the speed of movement of said member, an auxiliary relay which becomes deenergized only if the member is moving at a rate of speed above a predetermined minimum, means for passing energy to said first relay effective only if the current is of a predetermined characteristic, and means including a back contact of said auxiliary relay for passing energy to said second relay effective only if the current is of another predetermined characteristic.

20. Speed responsive apparatus for a moving member comprising, a pair of conductors, means for at all times supplying said pair of conductors with alternating current of low frequency, means governed by said member for supplying said pair of conductors with alternating currents of different higher frequencies in accordance with the speed of movement of said member, a first control relay and a second control relay both connected across said conductors, each said relay having an armature which is capable of following said alternations only if the frequency is below a given value, and each such value being different for each relay, a first auxiliary relay and a second auxiliary relay, means for energizing said first auxiliary relay only if the armature of said first control relay is operating, and means for energizing said second auxiliary relay only if the armature of said second control relay is operating.

21. Speed responsive apparatus for a moving member comprising, a generator including a rotor and a stator, said rotor being governed by said member, means for at all times supplying said stator with alternating current of low frequency to induce a corresponding current in said rotor, a pair of relays, means connecting said relays to said rotor whereby each relay is energized in alternate directions at a frequency corresponding to the frequency of the current supplied by said generator, each said relay being characterized by being inoperative if the frequency is above a given value, the value being different for each relay, and control relays selectively governed by said pair of relays.

22. Speed responsive apparatus for a moving member comprising, a plurality of primary relays having contacts capable of operating to follow a periodic energization of the relay windings but incapable of operating to follow such periodic energization of the relay windings if the frequency thereof is above a given value, the value being different for each relay, and means governed by said member for periodically energizing said relay windings at a frequency corresponding to the speed of movement of said member.

23. Speed responsive apparatus for a moving member comprising, a plurality of primary relays having contacts capable of operating to follow a periodic energization but incapable of operating to follow such periodic energization if the frequency thereof is above a given value, the value being different for each relay, and means governed by said member for periodically energizing said relays at a frequency corresponding to the speed of movement of said member, a plurality of secondary relays, means for selectively energizing said secondary relays in accordance with the condition of the contacts of said primary relays, and means for also energizing said secondary relays when said member is at rest.

24. Speed responsive apparatus for a moving member comprising, a plurality of primary relays having contacts capable of operating to follow a periodic energization but incapable of operating to follow such periodic energization if the frequency thereof is above a given value, the value being different for each relay, and means governed by said member for periodically energizing said relays at a frequency corresponding to the speed of movement of said member, a plurality of secondary relays each provided with two windings, means for selectively energizing one winding of said secondary relays according as the contacts of said primary relays are operating or are at rest, and means also governed by said member for energizing the other winding of all the secondary relays when said member is at rest or is moving at very slow speeds.

25. Speed responsive apparatus for a moving member comprising, a main relay, means governed by said member for periodically energizing said main relay at a frequency corresponding to the speed of movement of said member, a contact of said relay which is capable of operating between two extreme positions to follow said periodic energizations when and only when the frequency is below a given value, a direct current auxiliary relay, and means for supplying a winding of said direct current relay with unidirectional current when and only when said contact is operating.

26. Speed responsive apparatus for a moving member comprising, a main relay, means governed by said member for periodically energizing said main relay at a frequency corresponding to the speed of movement of said member, a contact of said relay which is capable of operating between two extreme positions to follow said periodic energizations when and only when the frequency is below a given value, a direct current auxiliary relay, a transformer, and means governed by said contact and including said transformer for supplying said auxiliary relay with unidirectional current when and only when said contact is operating.

27. Vehicle carried speed responsive apparatus comprising, a movable contact adjacent an axle of said vehicle and caused to operate at a frequency to correspond to the speed of rotation of said axle, a plurality of relays located more remote from said axle, equipment including said contact for producing electrical currents of different characteristics depending upon the speed of movement of said contact, control means receiving energy from said equipment for selectively governing said relays in accordance with the characteristics of the current produced by said equipment, and means responsive to movement of said member for preventing said control means from governing said relays unless the axle is moving at a speed above a predetermined minimum.

28. Vehicle carried speed responsive apparatus comprising, a movable contact adjacent an axle of said vehicle and caused to operate at a frequency to correspond to the speed of rotation of said axle, a plurality of relays located more remote from said axle, equipment including said contact for producing electrical currents of different characteristics depending upon the speed of movement of said contact, control means receiving energy from said equipment for selectively governing said relays in accordance with the characteristics of the current produced by said equipment, and means responsive to movement of said member including another contact operated by said axle for preventing said control means from governing said relays unless the axle is moving at a speed above a predetermined minimum.

29. Vehicle carried speed responsive apparatus comprising, a movable contact adjacent an axle of said vehicle and caused to operate at a frequency to correspond to the speed of rotation of said axle, a plurality of relays located more remote from said axle, equipment including said contact for providing electrical currents of different characteristics depending upon the speed of movement of said contact, control means receiving energy from said equipment for selectively governing said relays in accordance with the characteristics of the current produced by said equipment, means responsive to movement of said member for preventing said control means from governing said relays unless the axle is moving at a speed above a predetermined minimum, and governing means for said vehicle selectively controlled by said relays.

30. Vehicle carried speed responsive apparatus comprising an alternating current generator mounted adjacent an axle of said vehicle and caused to rotate at a speed to correspond to the speed of rotation of said axle, a pair of conductors connected to said generator, a plurality of main relays located remote from said generator also connected to said pair of conductors, said relays being operative or inoperative according as the frequency of the current supplied thereto is below or above respectively a given value, the value being different for each relay, a plurality of auxiliary relays selectively governed by said control relays, and means responsive to movement of said member for preventing the control of said auxiliary relays by said main relays unless the axle is rotating at a speed above a predetermined minimum.

31. In speed responsive mechanism, in combination, an electroresponsive control device for controlling a moving element, said device having a member having a normal position in which it effects one type of control of the moving element, said member also having an operated position in which it effects a different type of control of the moving element, said member being movable from said normal position to said operated position when and only when said control device is supplied with unidirectional current, means operable only on movement of the moving element for supplying to a control circuit alternating current at a frequency which varies in accordance with the speed of the element, means responsive to the supply of alternating current to said circuit to supply unidirectional current to said control device, said means being operable only when the frequency of the alternating current supplied to said control circuit is below that which corresponds to a predetermined element speed, and other means for also effecting the supply of unidirectional current to said control device when the element is not in motion.

32. In speed responsive mechanism, in combination, an electroresponsive control device for controlling a moving element, said device having a member having a normal position in which it effects one type of control of the moving element, said member also having an operated position in which it effects a different type of control of the moving element, said member being movable from said normal position to said operated position when and only when said control device is supplied with unidirectional current, means operable only on movement of the moving element for supplying to a control circuit alternating current at a frequency which varies in accordance with the speed of the element, means responsive to the supply of alternating current to said circuit to supply unidirectional current to said control device, said means being operable only when the frequency of the alternating current supplied to said control circuit is below that which corresponds to a predetermined element speed, other means for also effecting the supply of unidirectional current to said control device when the element is not in motion, and means responsive to movement of the element for rendering said other means ineffective to energize the control device when the element speed is increased beyond a predetermined relatively low speed.

33. In speed responsive mechanism, in combination, an electroresponsive control device for controlling a moving element, the control device having a movable member having a normal position and being movable therefrom to an operated position, said member being operable in the normal position to effect one type of control of the moving element and being operable in the operated position to effect a different type of control of the moving element, the control device incorporating a plurality of windings either of which when energized with unidirectional current will effect movement of the movable member from the normal position to the operated position, means operated only on movement of the moving element for supplying to a control circuit alternating current the frequency of which varies in accordance with the speed of the moving element, means responsive to the supply of alternating current to said control circuit to supply unidirectional current to a winding of said control device, said means being operable only when the frequency of the alternating current supplied to said control circuit is below that which corresponds to a predetermined element speed, and other means for effecting the supply of unidirectional current to another winding of said control device when the moving element is not in motion.

34. In speed responsive mechanism, in combination, an electroresponsive control device for controlling a moving element, the control device having a movable member having a normal position and being movable therefrom to an operated position, said member being operable in the normal position to effect one type of control of the moving element and being operable in the operated position to effect a different type of control of the moving element, the control device incorporating a plurality of windings either of which when energized with unidirectional current will effect movement of the movable member from the normal position to the operated position, means operated only on movement of the moving element for supplying to a control circuit alternating current the frequency of which varies in accordance with the speed of the moving element, means responsive to the supply of alternating current to said control circuit to supply unidirectional current to a winding of said control device, said means being operable only when the frequency of the alternating current supplied to said control circuit is below that which corresponds to a predetermined element speed, and other means for effecting the supply of unidirectional current to another winding of said control device when the moving element is not in motion, said other means being effective to supply current to said winding when the moving element is not in motion and being rendered ineffective to supply current thereto on movement of said element at speeds in excess of a predetermined speed.

35. In speed responsive mechanism, in combination, an electroresponsive control device for controlling a moving element, the control device having a movable member having a normal position and being movable therefrom to an operated position, said member being operable in the normal position to effect one type of control of the moving element and being operable in its operated position to effect a different type of control of the moving element, the control device incorporating a plurality of windings either of which when energized with unidirectional current will effect movement of the movable member from the normal position to the operated position, a contact operated in accordance with the speed of the moving element to alternately complete and interrupt the circuit for supplying unidirectional current to a winding of said control device, the lengths of the open periods of said contact with respect to the closed periods thereof increasing with increases in the speed of the moving element, whereby the degree of energization of said winding progressively decreases on an increase in the speed of the moving element and at a predetermined speed of the moving element becomes insufficient to maintain the movable member of the control device in the operated position, means operated only on movement of the moving element for supplying to a control circuit alternating current the frequency of which varies in accordance with the speed of the moving element, and means responsive to the supply of alternating current to said control circuit to supply unidirectional current to another of said control device windings, said means being operable only when the frequency of the alternating current supplied to said control circuit is below that which corresponds to a predetermined speed of the moving element.

ANDREW J. SORENSEN.